US012681928B2

(12) United States Patent
Kunz

(10) Patent No.: US 12,681,928 B2
(45) Date of Patent: Jul. 14, 2026

(54) TEXT-GENERATED INSTRUCTION OBJECTS USING LARGE LANGUAGE MODEL

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 18/367,778

(22) Filed: Sep. 13, 2023

(65) Prior Publication Data

US 2025/0086171 A1     Mar. 13, 2025

(51) Int. Cl.
*G06F 17/27*      (2006.01)
*G06F 16/2452*    (2019.01)
*G06F 16/2458*    (2019.01)
*G06F 40/40*      (2020.01)

(52) U.S. Cl.
CPC .... *G06F 16/24522* (2019.01); *G06F 16/2458* (2019.01); *G06F 40/40* (2020.01)

(58) Field of Classification Search
CPC ........ G06F 16/00; G06F 16/24; G06F 16/242; G06F 16/24522; G06F 16/2452; G06F 16/2453; G06F 16/2458; G06F 16/2455; G06F 16/25; G06F 16/28; G06F 16/80; G06F 40/40; G06F 40/10; G06N 5/02; G06N 5/022; G06N 5/04
See application file for complete search history.

(56) References Cited

U.S. PATENT DOCUMENTS 11,968,088 B1 * 4/2024 Yan .................... H04L 41/0823
2022/0156254 A1 * 5/2022 Bonaci ................. G06F 16/901

2023/0041181 A1 * 2/2023 Wang .................. G06Q 30/015
2024/0119028 A1 * 4/2024 Kunz ..................... G06F 16/116
2024/0303050 A1 * 9/2024 Kunz ........................ G06F 8/30
(Continued)

FOREIGN PATENT DOCUMENTS

WO     WO-2024253927 A1 * 12/2024   ............. G06F 40/30

OTHER PUBLICATIONS

Ghandeharizadeh, Shahram, Jason Yap, and Sumita Barahmand. "Cosar-cqn: an application transparent approach to cache consistency." Twenty first international conference On software engineering and data engineering. 2012. (Year: 2012).*

(Continued)

*Primary Examiner* — Michael Ortiz-Sanchez
(74) *Attorney, Agent, or Firm* — SCHWEGMAN LUNDBERG & WOESSNER, P.A.

(57)                ABSTRACT

In an example embodiment, a solution is provided that automatically adds a system message to natural language text provided by a user to generate a prompt to a Large Language Model (LLM) to automatically generate a code in a declarative language format, the code corresponding to the natural language text. Furthermore, retrieval augmented generation may be utilized to overcome the maximum number of contextual tokens permitted as input to an LLM. More particularly, the system message may be designed to include an instruction to the LLM to generate search calls for one or more entity definitions in a specified format from a database. The search calls may then be performed on the database via a similarity search to obtain the relevant information, which can then be passed back into the LLM for the generation of the code.

20 Claims, 5 Drawing Sheets

(56) References Cited

U.S. PATENT DOCUMENTS

| | | | | |
|---|---|---|---|---|
| 2024/0403373 A1* | 12/2024 | Chao | .................. | G06F 16/9538 |
| 2025/0005058 A1* | 1/2025 | Khosla | ................ | G06F 16/3344 |
| 2025/0086211 A1* | 3/2025 | Bolcer | ................ | G06F 16/3344 |
| 2025/0086213 A1* | 3/2025 | Dilipkumar | ....... | G06F 16/24522 |

OTHER PUBLICATIONS

"Introduction—OpenAI API", OpenAI API, [Online]. Retrieved from the Internet: <URL: https://platform.openai.com/docs/plugins/introduction>, (Accessed Jun. 19, 2023), 2 pgs.

"LangChain-ai/langchain-aiplugin", GitHub, Inc., [Online]. Retrieved from the Internet: <URL: https://github.com/langchain-ai/langchain-aiplugin>, (Apr. 8, 2023), 4 pgs.

* cited by examiner

100

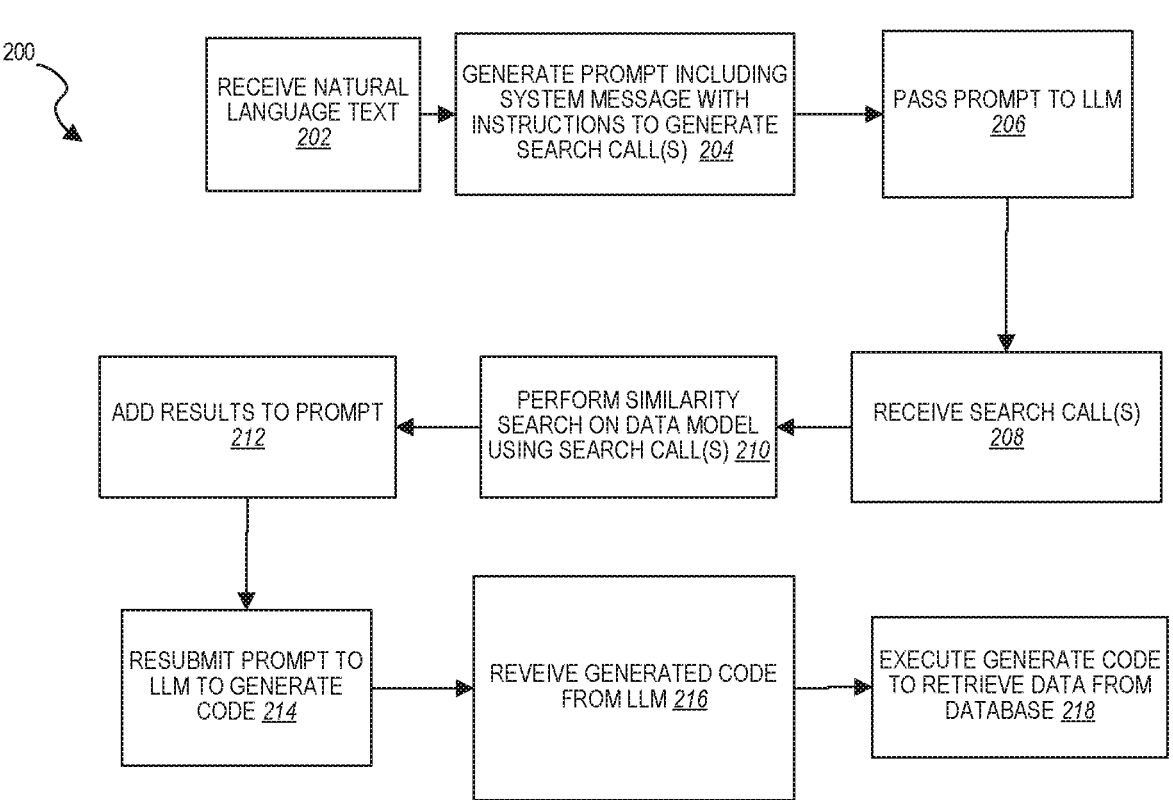

200

RECEIVE NATURAL LANGUAGE TEXT
202

GENERATE PROMPT INCLUDING SYSTEM MESSAGE WITH INSTRUCTIONS TO GENERATE SEARCH CALL(S) 204

PASS PROMPT TO LLM
206

ADD RESULTS TO PROMPT
212

PERFORM SIMILARITY SEARCH ON DATA MODEL USING SEARCH CALL(S) 210

RECEIVE SEARCH CALL(S)
208

RESUBMIT PROMPT TO LLM TO GENERATE CODE 214

REVEIVE GENERATED CODE FROM LLM 216

EXECUTE GENERATE CODE TO RETRIEVE DATA FROM DATABASE 218

*FIG. 2*

TEXT-GENERATED INSTRUCTION OBJECTS USING LARGE LANGUAGE MODEL

TECHNICAL FIELD

This document generally relates to computer systems. More specifically, this document relates to use of large language models.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

FIG. 2 is a flow diagram illustrating a method for automatically generating code in a declarative language format from natural language text, in accordance with an example embodiment.

DETAILED DESCRIPTION

Figure 1:
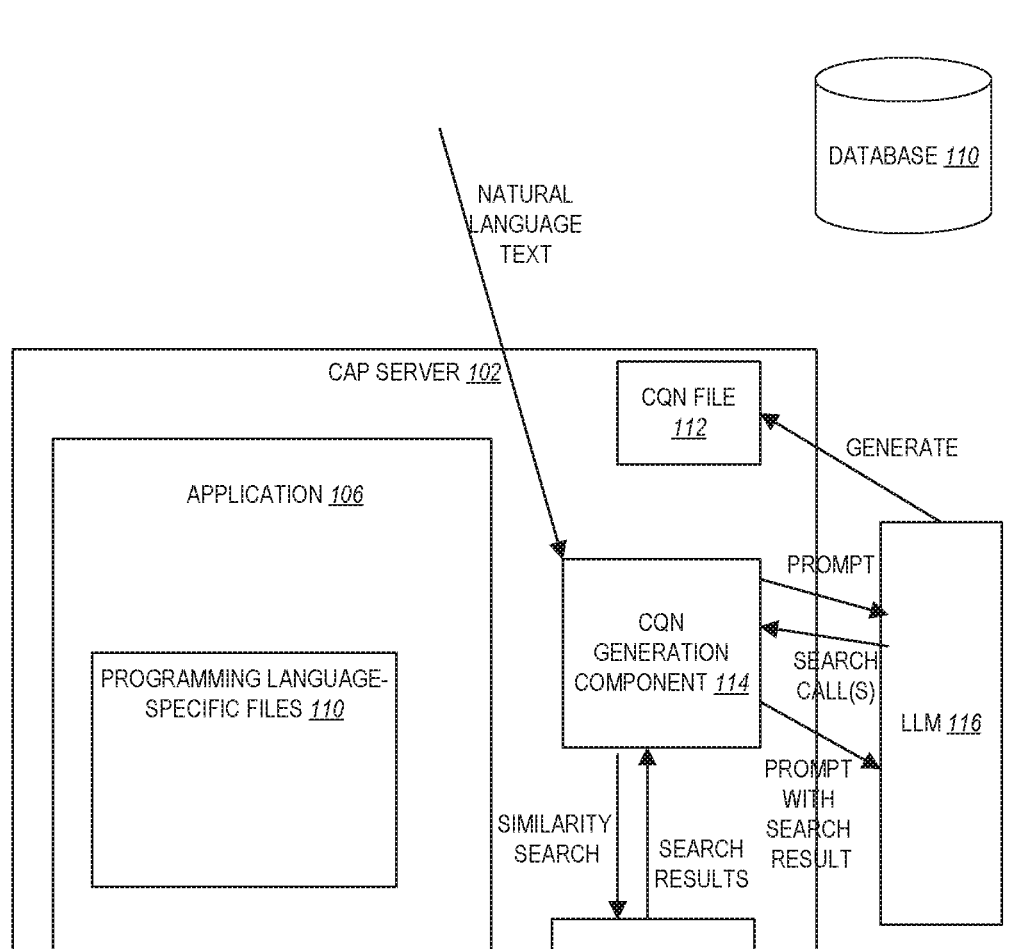
FIG. 1 is a block diagram illustrating a system for automatically generating a CQN object from natural language text, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. An example cloud platform includes SAP Cloud Application Platform (CAP), from SAP SE of Walldorf, Germany. A cloud platform may run a data model infrastructure, where data models can be created and run.

One example of such a data model infrastructure is Core Data Services (CDS) from SAP SE of Walldorf, Germany. CDS enables service definitions and data models to be declaratively captured in plain object notations. CDS models are typically written in CDS language, and when compiled are typically stored in Javascript Object Notation (JSON) files, which comply with a standard notation, such as core schema notation (CSN). These models are compiled and run on a server, which can then handle requests for the application defined by the model(s) as they come in.

A common architecture in cloud platforms includes services (also referred to as microservices), which have gained popularity in service-oriented architectures (SOAs). In such SOAs, applications are composed of multiple, independent services. The services are deployed and managed within the cloud platform and run on top of a cloud infrastructure. In some examples, service-based applications can be created and/or extended using an application programming framework. In an example embodiment, the software servers created implement the services.

CAP provides a framework with a server that is able to process operations defined by a data model created by an application developer. The framework may utilize a language-agnostic notation, such as Core Query Notation (CON). CON is a syntax used to represent queries in a structured and standardized manner. It can be used in database management systems to allow users to search and retrieve specific information from a large data set in an organized and efficient manner. The syntax typically includes elements such as keywords, operators, and logical statements that are combined to form a query, which can then be executed to retrieve relevant information from the data set. Essentially, however, it can be used as an abstract way to encode intent in terms of queries (e.g., SELECT, CREATE, etc.).

Creating CON objects can be time consuming for users. It would be desirable to utilize Generative Artificial Intelligence (GAI) to automatically generate CQN objects from natural language text provided by a user, such as by using a large language model (LLM) to generate a CQN object from the natural language text, freeing up the responsibility of actually creating a CQN object from the user. However, there are technical problems encountered when attempting to use an LLM to generate CQN objects. More specifically, in order to effectively generate a CON object, an LLM needs to have information about the underlying data model, in order to properly name and format entities, such as variables or field names, within the generated CON model. LLMs, however, have limitations on how much contextual data (such as a maximum number of tokens) can be passed to them. This creates a problem because in many circumstances the size of a data model is greater than the maximum amount of contextual data that the LLM can receive. Additionally, it can be technically challenging for LLMs to generate text in proper CON format, which generally involves database commands specified in a JavaScript format.

In an example embodiment, a solution is provided that automatically adds a system message to natural language text provided by a user to generate a prompt to an LLM to automatically generate a CQN object corresponding to the natural language text. Furthermore, retrieval augmented generation may be utilized to overcome the maximum number of contextual tokens permitted as input to an LLM. More particularly, the system message may be designed to include an instruction to the LLM to generate search calls for one or more entity definitions in a specified format from a data model. The search calls may then be performed on the data model via a similarity search to obtain the relevant information, which can then be passed back into the LLM for the generation of the CQN object.

However, a technical problem is encountered with the use of an LLM to write CAP code, due to the presence of data models as needed context for the LLM to accurately create programming syntax. A data model, for example, may specify specific names for data fields that may not be known to the user providing the natural language syntax. While the data model itself could be fed into the LLM as context data along with a natural language prompt, LLMs have a limit as to how many context-based tokens they can use as input. Since CAP-based data models tend to be large, it is technically infeasible to feed them as context data with a natural language prompt to an LLM.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with a GPT model will be described.

FIG. 1 is a block diagram illustrating a system 100 for automatically generating a CQN object from natural language text, in accordance with an example embodiment. Here, a CAP server 102 provides a server allowing users 104, to request the creation and management of software servers, such as OData servers for web services, by the CAP server 102. Since the CAP server 102 provides a server that implements a software framework for creating and managing applications, it may be generally referred to as a framework server. A user 104 may create, for example, an application 106 as well as generate one or more data models, such a data model 108. The purpose of a data model 108 is to define information about data and how the data is accessed by the application 106. Thus, for example, data model 108 may define tables, and fields within tables, that will be used by the application 106.

The data model 108 defines how data is stored in a corresponding database 110. In an example embodiment, a user wishes to create a CON object 112 to access data in the database 110, but wishes to do so in natural language format rather than have to write the text of the CON object 112 itself. Thus, for example, the user may wish to provide the following natural language text instruction "Get me the ID and name of all adults in my client list."

In an example embodiment, a CQN generation component 114 is provided that receives this natural language text and adds a system message to generate a prompt. This prompt may then be sent to an LLM 116 to instruct the LLM 116 to generate a CQL file reflecting the natural language text.

As mentioned above, however, the LLM 116 may not be technically capable of generating the proper CQL file directly without knowing enough context, such as information about the data model 108, but technical limitations on the LLM 116 may prevent the data model 108 itself from being provided to the LLM 116. Thus, in an example embodiment, the system message added by the CON generation component 114 to generate the prompt includes instructions to generate search calls for one or more entity definitions in a specified format from a data model 108. Thus, the LLM 116 first returns generated search calls to the CON generation component 114, and then the CQN generation component 114 performs these search calls to obtain search results from the data model 108. The search calls perform a similarity search, looking for data entities (e.g., tables, fields within tables, etc.) that are similar to that generated by the LLM 116 but that are actually contained in the data model 108.

For instance, in the above example where the natural language text instruction requested an ID and name of all adults in a client list, it may be that the term "client" is not a field or a table name within data model 108, which may use the term "customer" to mean essentially the same thing. The LLM 116 does not have this information so it cannot generate the CQN object 112 correctly.

The CQN generation component 114 therefore performs the generated search call(s), which here may include a search call of "search ('client entity')". This may be performed as a similarity search on the data model 108, which returns information that the most similar entity to "client" is "customer." The CQN generation component 114 can then take this returned information and add it to the prompt, and then resubmit the (newly changed) prompt to the LLM 116, which then generates the CQN object 112.

This may be an iterative process, where the LLM 116 continuing to generate search calls in response to receiving prompts, if it lacks some information that could be obtained from the data model 108. Once the LLM 116 has all the information it needs, however, it can then generate the CQN object 112.

Once produced, the CQN object 112 can then be parsed at any time to run a search on the database 110.

In another example embodiment, in lieu of or in conjunction with the retrieval augmented generation, LLM fine tuning is used to aid in the generation of the CON object 112. Here, the LLM 116 is treated as a base model and the LLM 116 (or an instance of the LLM 116) is retrained with additional context information, such as the data model 108. This changes the parameters of the LLM 116 so that it handles data model-specific requests better. It essentially creates a customized version of the LLM 116 so that it intrinsically knows that, for example, "client" really means "customer" in this context.

FIG. 2 is a flow diagram illustrating a method 200 for automatically generating code in a declarative language format from natural language text, in accordance with an example embodiment. At operation 202, natural language text describing data to be retrieved from a database is received. At operation 204, a prompt is generated by adding a system message to the natural language text. The system message including an instruction to generate code in the declarative language format for the retrieval of the data from the database. The instruction includes an instruction to generate one or more search calls, on a database, for one or more entities specified in the natural language text.

At operation 206, the prompt is passed to a large language model (LLM) to generate the one or more search calls. At operation 208, the one or more search calls as generated by the LLM are received from the LLM. At operation 210, a similarity search is performed on the data model using the one or more search calls, returning one or more results. At operation 212, the one or more results are added to the prompt. At operation 214, the prompt is resubmitted to the LLM to generate the code. It should be noted that resubmitting the prompt can either be performed using one single larger prompt (i.e., enlarging the original prompt and resubmitting the entire enlarged prompt), or may be performed using a second prompt after the first prompt. For purposes of claim interpretation, the concepts of "adding" the one or more results to the prompt and resubmitting the prompt shall be interpreted broadly to include embodiments where the one or more results are submitted as an adjunct, but technically separate, prompt from the original prompt.

At operation 216, the generated code is received from the LLM. At operation 218, the generated code is executed to retrieve data from the database.

Thus, as an example, a user may provide the following natural language prompt:

"Get all books and expand to writer where title contains the word "story."

In response, the CGN generation component adds the following system message:

In the SAP Cloud Application Programming Model, create a CON based on the following prompt. If you need more information, you can create code blocks to search for more information like that:

"'json {"seach": "your search term"}

"', which it appends to the natural language prompt.

The LLM then generates the search calls, which the CGN generation component detects in the text returned from the LLM. These search calls may be as follows:

json {search books} json {search writer}

The CGN generation component then performs the search calls on the database, which informs it that the data model contains an exact match for "books," but that "author" is the closest match for "writer". The CGN generation component then reforms the prompt to the LLM to be as follows:

In the SAP Cloud Application Programming Model, create a CON based on the following prompt. The entities are:

entity Authors {key ID: UUID; firstName: String; lastName: String};

entity Books {key ID: UUID; title; String; author: Association to Author};

Prompt:

Get all books and expand to author where title contains the word "Story"

The resultant code generated by the LLM, in CWN format, would be as follows:

```javascript
const cqn = SELECT
  .from('Books')
  .where('title', 'like', '%Story%')
  .expand('author');
```

In some example embodiment, the LLM is trained generally to generate text based on a natural language query and contextual information passed to it. As described above, the LLM may be implemented as a generative pre-trained transformer (GPT) model or a bidirectional encoder, but in example embodiments the LLM, regardless of implementation, is trained to generate text regardless of the purpose of the text generation. While contextual information may be passed to the LLM to aid in the generation of text that is relevant to the specific purpose being sought (or environment in which it is being sought), the model itself is trained using training data across many different purposes and environments.

In other example embodiments, however, while the LLM itself is still trained in a general manner using training data across many different purposes and environments, a specific instance of the LLM is fine-tuned to operate more effectively specifically for the purpose and environment of generating code in a declarative language format. This re-trains the LLM to be a special-purpose LLM for declarative language format code generation.

The fine tuning may include obtaining an LLM trained generally (here denoted as a "general LLM", and then rerunning a machine learning algorithm that was used to train the general LLM using purpose and environment/specific data. In this case, the training data includes data models, such as CAP data models. The machine learning model then retrains the general LLM to produce a special-purpose LLM.

The retraining may include the following operations. First the training data is cleaned and preprocessed to remove any irrelevant or sensitive information. It is then split into smaller chunks or sequences that the model can process effectively. The model is fine tuned using a process called unsupervised learning. The primary objective during training is to predict the next word in a sequence given the previous words. This is done using a technique called "masked language modeling" or "cloze task."

The objective of masked language modeling is to predict missing words in a sentence or sequence of words. During the training process, some words in the input text are randomly masked, and the model is then required to predict the masked words based on the context provided by the surrounding words. To accomplish masked language modeling, three operations are performed: masking, context-based prediction, loss calculation, and finally backpropagation and updating. For masking, in the input text or sequence of words, a certain percentage of words is randomly selected and replaced with a special token. In context-based prediction, the LLM then processes the masked input and uses the context from the surrounding words to predict the masked word. The model considers the relationships between words, the grammar of the language, and the overall semantics to make an informed guess about the masked word.

In loss calculation, the model's prediction for the masked word is compared to the actual word (the original word that was masked) using a loss function, such as cross-entropy loss. The loss function quantifies the difference between the predicted probability distribution over words and the true distribution (one-hot encoded vector representing the actual word). Finally, for backpropagation and Update, the loss is backpropagated through the model, and the model's parameters (weights and biases) are updated to minimize the loss and improve the model's ability to predict masked words accurately.

As far as cloze task, this involves the model being presented with a passage of text with certain words or phrases removes, and the model is challenged to fill in the missing words based on the context provided.

Returning now to the retraining process, the model is exposed to the preprocessed data and learns from it iteratively over multiple training iterations. During each iteration, the model adjusts its internal parameters (weights and biases) to minimize the prediction errors and improve its performance. The training process involves optimization algorithms like Stochastic Gradient Descent (SGD) or its variants, which fine-tune the model's parameters to make it better at predicting the next word in a sequence.

Hyperparameter Tuning can then be performed where various hyperparameters (e.g., learning rate, batch size, number of layers) are tuned to find the best configuration that results in optimal performance and generalization.

Figure 3:
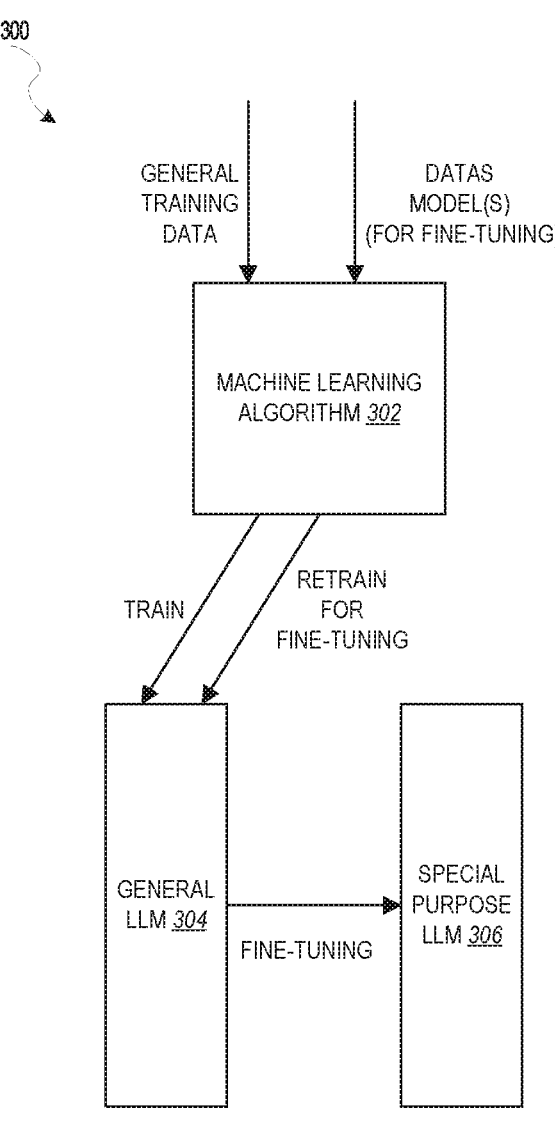
FIG. 3 is a block diagram illustrating a system for fine-tuning an LLM, in accordance with an example embodiment.

FIG. 3 is a block diagram illustrating a system 300 for fine-tuning an LLM, in accordance with an example embodiment. Here, as mentioned above, a machine learning algorithm 302 uses general training data to train a general LLM 304. The general LLM 304 may be fine-tuned into a special-purpose LLM 306 by passing one or more data models, such as CAP data models, into the machine learning algorithm 302, which performs retraining of the general LLM 304 to achieve the fine-tuning, and ultimately produce the special purpose LLM 306.

In view of the disclosure above, various examples are set forth below. It should be noted that one or more features of an example, taken in isolation or combination, should be considered within the disclosure of this application.

Example 1. A system comprising:

at least one hardware processor; and a computer-readable medium storing instructions that, when executed by the at least one hardware processor, cause the at least one hardware processor to perform operations comprising:

receiving natural language text describing data to be retrieved from a database;

generating a prompt by adding a system message to the natural language text, the system message including an instruction to generate code in a declarative language format for the retrieval of the data from the database, the instruction including a request to generate one or more search calls, on a database, for one or more entities specified in the natural language text;

passing the prompt to a large language model (LLM);

receiving, from the LLM, the one or more search calls as generated by the LLM;

executing a similarity search on the database using the one or more search calls, to obtain one or more results;

adding the one or more results to the prompt;

resubmitting the prompt to the LLM; and receiving, from the LLM, the code in the declarative language format as generated by the LLM.

Example 2. The system of Example 1, wherein the declarative language format is Core Query Notation (CQN).

Example 3. The system of Examples 1 or 2, wherein the LLM is a Generative Pre-trained Transformer (GPT) model.

Example 4. The system of any of Examples 1-3, wherein the operations further comprise fine-tuning the LLM using the data model.

Example 5. The system of any of Examples 1-4, wherein the operations further comprise: retrieving data from the database by executing the code.

Example 6. The system of any of Examples 1-5, wherein the database defines table names and field names of fields within corresponding tables.

Example 7. The system of any of Examples 1-6, wherein the database defines entities used by an application operating on a cloud application server.

Example 8. A method comprising:

receiving natural language text describing data to be retrieved from a database;

generating a prompt by adding a system message to the natural language text, the system message including an instruction to generate code in a declarative language format for the retrieval of the data from the database, the instruction including a request to generate one or more search calls, on a database, for one or more entities specified in the natural language text;

passing the prompt to a large language model (LLM);

receiving, from the LLM, the one or more search calls as generated by the LLM;

executing a similarity search on the database using the one or more search calls, to obtain one or more results;

adding the one or more results to the prompt;

resubmitting the prompt to the LLM; and receiving, from the LLM, the code in the declarative language format as generated by the LLM.

Example 9. The method of Example 8, wherein the declarative language format is Core Query Notation (CON).

Example 10. The method of Examples 8 or 9, wherein the LLM is a Generative Pre-trained Transformer (GPT) model.

Example 11. The method of any of Examples 8-10, further comprising: wherein the operations further comprise fine-tuning the LLM using the database.

Example 12. The method of any of Examples 8-11, further comprising: retrieving data from the database by executing the code.

Example 13. The method of any of Examples 8-12, wherein the database defines table names and field names of fields within corresponding tables.

Example 14. The method of any of Examples 8-13, wherein the database defines entities used by an application operating on a cloud application server.

Example 15. A non-transitory machine-readable medium storing instructions which, when executed by one or more processors, cause the one or more processors to perform operations comprising:

receiving natural language text describing data to be retrieved from a database;

generating a prompt by adding a system message to the natural language text, the system message including an instruction to generate code in a declarative language format for the retrieval of the data from the database, the instruction including a request to generate one or more search calls, on a database, for one or more entities specified in the natural language text;

passing the prompt to a large language model (LLM);

receiving, from the LLM, the one or more search calls as generated by the LLM;

executing a similarity search on the database using the one or more search calls, to obtain one or more results;

adding the one or more results to the prompt;

resubmitting the prompt to the LLM; and receiving, from the LLM, the code in the declarative language format as generated by the LLM.

Example 16. The non-transitory machine-readable medium of Example 15, wherein the declarative language format is Core Query Notation (CQN).

Example 17. The non-transitory machine-readable medium of Examples 15 or 16, wherein the LLM is a Generative Pre-trained Transformer (GPT) model.

Example 18. The non-transitory machine-readable medium of any of Examples 15-17, wherein the operations further comprise fine-tuning the LLM using the database.

Example 19. The non-transitory machine-readable medium of any of Examples 15-18, wherein the operations further comprise: retrieving data from the database by executing the code.

Example 20. The non-transitory machine-readable medium of any of Examples 15-19, wherein the database defines table names and field names of fields within corresponding tables.

Figure 4:
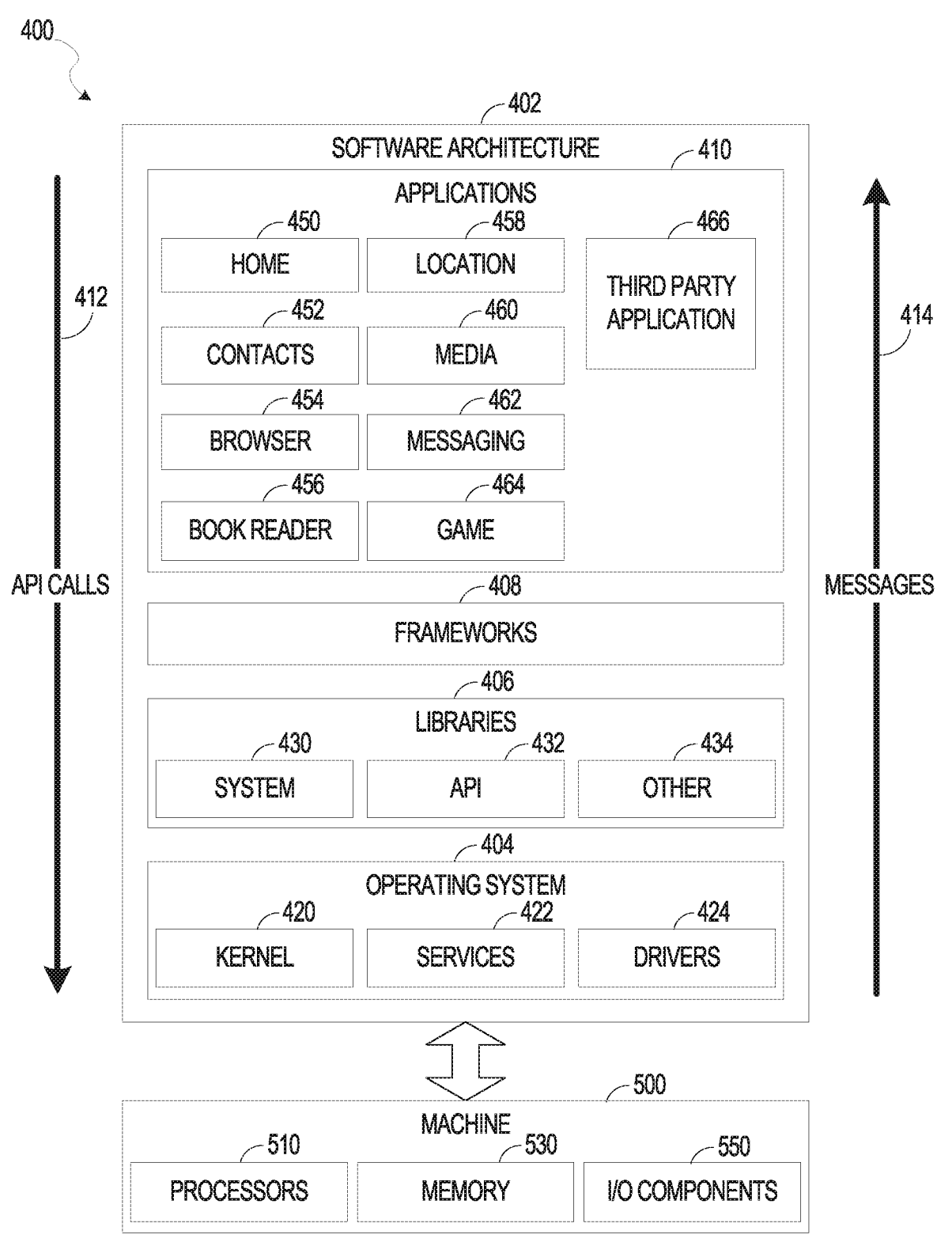
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
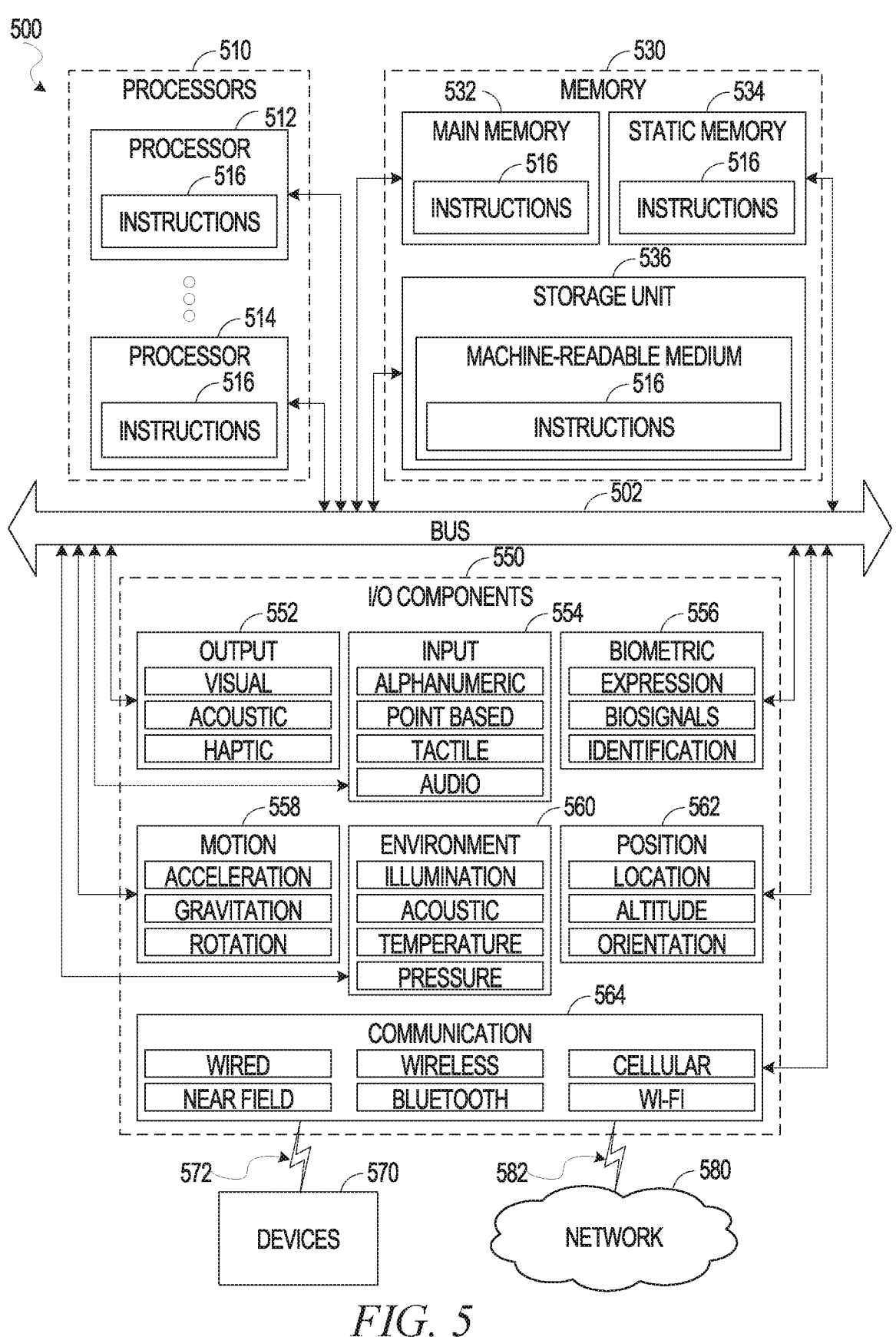
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 200 of FIG. 2. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
receiving natural language text describing data to be retrieved from a database;
generating a prompt by adding a system message to the natural language text, the system message including an instruction to generate code in a declarative language format for the retrieval of the data from the database, the instruction including a request to generate one or more search calls, on the database, for one or more entities specified in the natural language text;
passing the prompt to a large language model (LLM);
receiving, from the LLM, a first response comprising the one or more search calls as generated by the LLM, wherein the one or more search calls specify one or more entity definitions to be searched in the database;

executing a similarity search on the database using the one or more search calls, to obtain one or more similarity search results;
adding the one or more similarity search results to the prompt to generate a modified prompt, the modified prompt requesting that the LLM generate code in a declarative language format;
submitting the modified prompt to the LLM; and
receiving, from the LLM, a second response comprising the code in the declarative language format as generated by the LLM based on the modified prompt.

2. The system of claim 1, wherein the declarative language format is Core Query Notation (CQN).

3. The system of claim 1, wherein the LLM is a Generative Pre-trained Transformer (GPT) model.

4. The system of claim 1, wherein the operations further comprise fine-tuning the LLM using the database.

5. The system of claim 1, wherein the operations further comprise: retrieving data from the database by executing the code.

6. The system of claim 1, wherein the database defines table names and field names of fields within corresponding tables.

7. The system of claim 1, wherein the database defines entities used by an application operating on a cloud application server.

8. A method comprising:
receiving natural language text describing data to be retrieved from a database;
generating a prompt by adding a system message to the natural language text, the system message including an instruction to generate code in a declarative language format for the retrieval of the data from the database, the instruction including a request to generate one or more search calls, on the database, for one or more entities specified in the natural language text;
passing the prompt to a large language model (LLM);
receiving, from the LLM, a first response comprising the one or more search calls as generated by the LLM, wherein the one or more search calls specify one or more entity definitions to be searched in the database;
executing a similarity search on the database using the one or more search calls, to obtain one or more similarity search results;
adding the one or more similarity search results to the prompt to generate a modified prompt, the modified prompt requesting that the LLM generate code in a declarative language format;
submitting the modified prompt to the LLM; and
receiving, from the LLM, a second response comprising the code in the declarative language format as generated by the LLM based on the modified prompt.

9. The method of claim 8, wherein the declarative language format is Core Query Notation (CQN).

10. The method of claim 8, wherein the LLM is a Generative Pre-trained Transformer (GPT) model.

11. The method of claim 8, further comprising fine-tuning the LLM using the database.

12. The method of claim 8, further comprising retrieving data from the database by executing the code.

13. The method of claim 8, wherein the database defines table names and field names of fields within corresponding tables.

14. The method of claim 8, wherein the database defines entities used by an application operating on a cloud application server.

15. A non-transitory machine-readable medium storing instructions which, when executed by one or more processors, cause the one or more processors to perform operations comprising:

receiving natural language text describing data to be retrieved from a database;

generating a prompt by adding a system message to the natural language text, the system message including an instruction to generate code in a declarative language format for the retrieval of the data from the database, the instruction including a request to generate one or more search calls, on the database, for one or more entities specified in the natural language text;

passing the prompt to a large language model (LLM);

receiving, from the LLM, a first response comprising the one or more search calls as generated by the LLM, wherein the one or more search calls specify one or more entity definitions to be searched in the database;

executing a similarity search on the database using the one or more search calls, to obtain one or more similarity search results;

adding the one or more similarity search results to the prompt to generate a modified prompt, the modified prompt requesting that the LLM generate code in a declarative language format;

submitting the modified prompt to the LLM; and receiving, from the LLM, a second response comprising the code in the declarative language format as generated by the LLM based on the modified prompt.

16. The non-transitory machine-readable medium of claim 15, wherein the declarative language format is Core Query Notation (CQN).

17. The non-transitory machine-readable medium of claim 15, wherein the LLM is a Generative Pre-trained Transformer (GPT) model.

18. The non-transitory machine-readable medium of claim 15, wherein the operations further comprise fine-tuning the LLM using the database.

19. The non-transitory machine-readable medium of claim 15, wherein the operations further comprise:

retrieving data from the database by executing the code.

20. The non-transitory machine-readable medium of claim 15, wherein the database defines table names and field names of fields within corresponding tables.

* * * * *